United States Patent
Patil et al.

(10) Patent No.: US 9,781,784 B2
(45) Date of Patent: Oct. 3, 2017

(54) CONTROL OF ILLUMINATION DEVICES USING DC-DC CONVERTERS

(71) Applicant: TEXAS INSTRUMENTS INCORPORATED, Dallas, TX (US)

(72) Inventors: Bharath Patil, Bangalore (IN); Jagannathan Venkataraman, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 318 days.

(21) Appl. No.: 14/533,763

(22) Filed: Nov. 5, 2014

(65) Prior Publication Data

US 2016/0128160 A1     May 5, 2016

(51) Int. Cl.
*G05F 1/00*     (2006.01)
*H05B 37/02*     (2006.01)
(Continued)

(52) U.S. Cl.
CPC ..... *H05B 33/0815* (2013.01); *H05B 33/0818* (2013.01); *G09G 2320/064* (2013.01); *H02M 3/156* (2013.01); *H05B 33/0845* (2013.01); *H05B 33/0851* (2013.01); *H05B 37/02* (2013.01); *H05B 41/3927* (2013.01); *Y02B 20/346* (2013.01); *Y02B 20/347* (2013.01); *Y10S 362/80* (2013.01)

(58) Field of Classification Search
CPC ............ H05B 33/0815; H05B 33/0818; H05B 33/0845; H05B 33/0851; H05B 37/02; H05B 41/3927; Y02B 20/346; Y02B 20/347; Y10S 362/80; G09G 2320/064; H02M 3/156; H02M 2001/0003; H02M 2001/0012; H02M 1/14; H02M 1/44

USPC ........ 315/291, 307, 224, 209 R, 360, 185 R; 345/102; 362/800, 227

See application file for complete search history.

(56) References Cited

U.S. PATENT DOCUMENTS 6,396,252 B1    5/2002   Culpepper et al.
7,388,358 B2    6/2008   Duan
(Continued)

OTHER PUBLICATIONS

International Search Report and Written Opinion, PCT/US2015/059314, Mar. 10, 2016, 6 pages.

*Primary Examiner* — Alexander H Taningco
*Assistant Examiner* — Christian L Garcia
(74) *Attorney, Agent, or Firm* — Goutham Kondapalli; Charles A. Brill; Frank D. Cimino (57) ABSTRACT

In an embodiment, method of controlling an illumination device by an output signal of a DC-DC converter is disclosed. The output signal is controlled by a PWM signal. The method includes receiving a feedback signal corresponding to variation in the output signal with respect to a pre-determined output signal, and determining a target duty cycle of the PWM signal based on the feedback signal. The PWM signal of the target duty cycle is capable of enabling the DC-DC converter to generate the pre-determined output signal. The method includes providing the PWM signal of an effective duty cycle equal to the target duty cycle over N switching pulses of the PWM signal to the DC-DC converter. The method provides the PWM signal by providing M switching pulses of a first PWM signal of a first duty cycle, and N–M switching pulses of a second PWM signal of a second duty cycle.

18 Claims, 4 Drawing Sheets

(51) Int. Cl.
*H05B 39/04* (2006.01)
*H05B 41/36* (2006.01)
*H05B 33/08* (2006.01)
H05B 41/392 (2006.01)
H02M 3/156 (2006.01)

(56) References Cited

U.S. PATENT DOCUMENTS

| | | |
|---|---|---|
| 7,456,624 B2 | 11/2008 | Sheng et al. |
| 8,716,955 B2 | 5/2014 | Chuang et al. |
| 2004/0146101 A1 | 7/2004 | Pearce |
| 2004/0251854 A1 | 12/2004 | Matsuda et al. |
| 2005/0286910 A1* | 12/2005 | Wernlund .......... H04B 10/6911 398/202 |
| 2013/0314693 A1* | 11/2013 | Skidmore ............... G01S 13/88 356/5.01 |
| 2014/0176618 A1* | 6/2014 | Lee ................... H05B 33/0818 345/690 |
| 2014/0225583 A1 | 8/2014 | Huang |
| 2015/0257230 A1* | 9/2015 | Lee ................... H05B 33/0851 315/186 |

* cited by examiner

CONTROL OF ILLUMINATION DEVICES USING DC-DC CONVERTERS

TECHNICAL FIELD

The present disclosure relates to mechanisms for providing constant current drive for illumination devices (for example, LED and LASER) using DC-DC converters.

BACKGROUND

Illumination devices that are very low power consuming devices are used in many applications, such as vehicles, household applications, indicators, data communication, and applications involving usage of light source. Examples of these devices non-exhaustively include Light Emitting Devices (LEDs) and Light Amplification by Stimulated Emission of Radiation (LASER) devices. These low power illumination devices are also used as light source in Time-of-Flight (ToF) imaging applications. ToF cameras work on a principle of illuminating an object by a light source and detecting light reflected from the illuminated object. Further, an image of the illuminated object is constructed based on a phase difference between the light emitted by the illumination device and the light reflected from the illuminated object.

There are stringent requirements for precise control of emitted power of light from the illumination devices in the ToF cameras due to the fact that multiple captures are used to get one frame of data and each capture has to match the other capture very precisely to minimize depth noise. It is noted that even a small change in a signal driving the illumination device (for example, an LED) results into huge changes because of I-V characteristics of the illumination device. In a typical ToF camera, each frame of capture may include multiple quadrants of capture operation. Each quadrant has four phases. In a 'reset' phase, a sensor inside the ToF camera is reset to clear accumulated signal from the illuminated objects. In a next phase, 'integration', the sensor and illumination are modulated by a time-of-flight controller (TFC) present in the ToF camera, the objects are illuminated and the sensor acquires a raw ToF signal from the illuminated object. In a 'readout phase', the raw ToF signal (a raw pixel data) in selected region of interest is readout by an analog to digital converter (ADC) and thereafter by the TFC. In a next phase 'dead time', the sensor and the ADC are inactive, and are in low-power mode. In an implementation, ToF assumes that from quadrant to quadrant, a total emitted power of the light emitted by the ToF camera does not change. A variation in total emitted power results into phase/depth error in processing captured images.

For optimal powering of illumination devices, for example LEDs, the ToF camera require specialized regulators that are capable of providing uniform pulse output and minimizing intensity variations, for example, with battery voltage and other operating conditions. Efforts have been made to drive an illumination device present in the ToF camera using analog implantations. For example, the illumination device is controlled by a Direct Current-to-Direct Current (DC-DC) converter, and the DC-DC converter is controlled by a Pulse Width Modulation (PWM) pulse generated by an analog controller. However, in such implementation of analog control of the DC-DC converter, operating points of a loop (formed by the DC-DC converter and the analog converter) tend to change between the quadrants in the ToF camera. Therefore, a digital loop control (by a digital controller) is increasingly used to control the DC-DC converter so as to maintain that the loop's operating point changes only at a frame boundary and not at quadrant boundary. However, unlike an analog loop, a digital loop has only a few fixed possibilities of duty cycle of the PWM pulse, as the duty cycles are changed in form of step changes. Therefore, it is desirable to have a digital based illumination control circuit that is capable of providing finer control of DC-DC converter and thereby a fine control of a constant current drive of the illumination devices.

SUMMARY

This summary is provided to introduce a selection of concepts in a simplified form that are further described below in the detailed description. This summary is not intended to identify key or essential features of the claimed subject matter, nor is it intended to be used as an aid in determining the scope of the claimed subject matter.

In an embodiment, a method of controlling an illumination device is disclosed. The illumination device is controlled by an output signal of a DC-DC converter. The method includes receiving a feedback signal corresponding to a variation in the output signal of the DC-DC converter with respect to a pre-determined output signal. The method includes controlling the output signal of the DC-DC converter so as to cause the output signal to be equal to the pre-determined output signal for controlling the illumination device. The controlling the output signal includes determining a target duty cycle of a PWM signal based on the feedback signal by a digital controller, where the PWM signal of the target duty cycle is capable of enabling the DC-DC converter to generate the pre-determined output. The controlling the output signal further includes providing the PWM signal of an effective duty cycle as equal to the target duty cycle over N switching pulses of the PWM signal to the DC-DC converter. The PWM signal of the effective duty cycle over the N switching pulses is provided by M switching pulses of a first PWM signal of a first duty cycle, and N–M switching pulses of a second PWM signal of a second duty cycle, where M and N are positive integers.

In another embodiment, a pulse width modulation (PWM) illumination control circuit for controlling an illumination device is disclosed. The PWM illumination control circuit includes a DC-DC converter for providing an output signal to drive the illumination device based on a PWM signal. The PWM illumination control circuit includes a digital controller coupled to the DC-DC converter for controlling the output signal of the DC-DC converter so as to cause the output signal to be equal to a pre-determined output signal for controlling the illumination device. The digital controller is configured to control the output signal by receiving a feedback signal corresponding to a variation in the output signal of the DC-DC converter with respect to the pre-determined output signal, and determining a target duty cycle of the PWM signal, where the PWM signal of the target duty cycle capable of generating the pre-determined output signal. The digital controller also provides the PWM signal of an effective duty cycle as equal to the target duty cycle over N switching pulses of the PWM signal to the DC-DC converter. Providing the PWM signal includes providing M switching pulses of a first PWM signal of a first duty cycle, and providing N–M switching pulses of a second PWM signal of a second duty cycle, where M and N are positive integers.

In another embodiment, a method of controlling an illumination device is disclosed. The illumination device is controlled by an output signal of a DC-DC converter, where the output signal of the DC-DC converter is controlled by a pulse width modulation (PWM) signal provided by a digital controller. The method includes receiving a feedback signal corresponding to a variation in the output signal of the DC-DC converter with respect to a pre-determined output signal. The method includes controlling the output signal of the DC-DC converter so as to cause the output signal to be equal to the pre-determined output signal for controlling the illumination device. The controlling the output signal includes determining a target duty cycle of a PWM signal based on the feedback signal by the digital controller, where the PWM signal of the target duty cycle is capable of enabling the DC-DC converter to generate the pre-determined output. The method further includes providing the PWM signal of an effective duty cycle as equal to the target duty cycle over N switching pulses of the PWM signal to the DC-DC converter. Providing the PWM signal includes providing one or more switching pulses of each of two or more PWM signals, where each PWM signal of the two or more PWM signals has a distinct duty cycle, where N is a positive integer.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to 'one embodiment' or 'an embodiment' means that a particular feature, structure, or characteristic described in connection with the embodiment is included in at least one embodiment of the present technology. The appearance of the phrase 'in one embodiment' in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Figure 1:
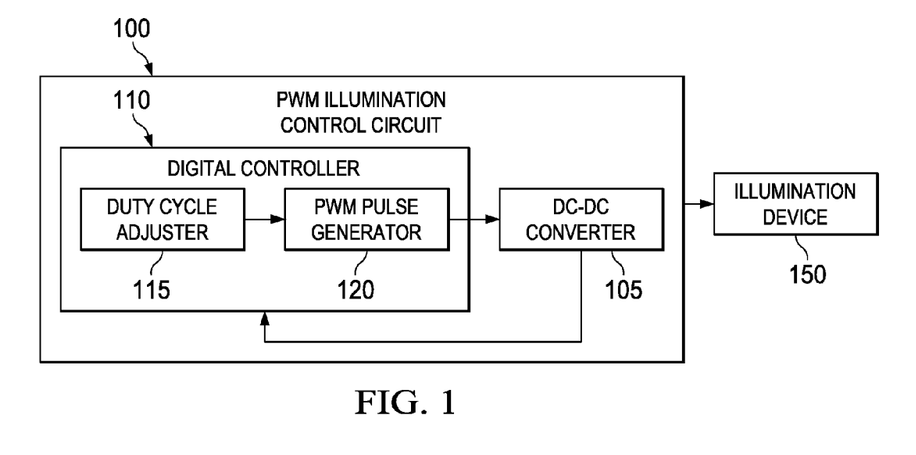
FIG. 1 is a block diagram of a pulse width modulation (PWM) illumination control circuit for driving an illumination device, in accordance with an example scenario.

FIG. 1 is a block diagram of a pulse width modulation (PWM) illumination control circuit for driving an illumination device, in accordance with an example scenario. It should be noted that the PWM illumination control circuit as seen in FIG. 1 is not as per example embodiments of the present technology, and some example embodiments of the present technology may be employed with modifications and improvements in the PWM illumination control circuit as shown in FIG. 1, and the same is described later with reference to FIGS. 2 to 5.

As shown in FIG. 1, a PWM illumination control circuit (hereinafter referred to as control circuit) 100 provides an illumination control signal to an illumination device 150. The illumination device 150 can be a Light Emitting Diode (LED) or a Light Amplification by Stimulated Emission of Radiation (LASER) device, and any other such light source used in a Time-of-Flight (ToF) imaging application. The illumination device 150 can also be used in other applications, for example, lighting application, flash in camera, optical communication, or any application that includes generation of light source by the LED or LASER, or any similar light sources.

The control circuit 100 includes a DC-DC converter 105 and a digital controller 110 for controlling the DC-DC converter 105. An output signal of the DC-DC converter 105 is a controlled DC voltage (the illumination control signal) to the illumination device 150. The controlled DC voltage acts as a constant drive signal for operating the illumination device 150. Examples of the DC-DC converter 105 include, but are not limited to, buck converter, boost converter, buck-boost converter and a flyback converter. The digital controller 110 includes a duty cycle adjuster (an increment/decrement unit) 115 and a PWM pulse generator 120. The duty cycle adjuster 115 receives a feedback signal responsive to a variation of the output of the DC-DC converter 105 with respect to a reference output. The reference output may be equal to a pre-determined output of the DC-DC converter 105 that needs to be provided to the illumination device 150.

The duty cycle adjuster 115 determines a duty cycle of a PWM signal that should be provided to the DC-DC converter 105 in order to mitigate the variation of the output of the DC-DC converter 105 from the reference output. For instance, the duty cycle adjuster 115 can include a digital counter for generating a control signal based on the variation of the output of the DC-DC converter 105. The control signal may be generated in response to the count states of the digital counter. For instance, the digital counter can count upto a 'Ton' time and upto a 'Ttotal' time for each individual switching pulse of the PWM signal, and the control signal can be generated based on counts upto the Ton time and counts upto the Ttotal time, and switching pulses of the PWM signal can be generated by the PWM pulse generator 120. The duty cycle adjuster 115 is configured to dynamically provide the control signal corresponding to the determined duty cycle and the PWM pulse generator 120 generates switching pulses of the PWM signal of the updated duty cycle. Further, the DC-DC converter 105, operating on the PWM signal received from the PWM pulse generator 120, provides the constant current drive signal to drive the illumination device 150.

In a conventional control circuit such as the control circuit 100, a high frequency clock signal can be required for a precise control of the duty cycle of the PWM signal, and this drawback can be understood with the following example. A case can be considered where a switching frequency of the DC-DC converter 105 is 1 MHz, and a clock frequency of a digital clock signal in the digital controller 110 is 100 MHz. In this example, a PWM pulse may be generated with varying duty cycles of N/100, where N represents an integral number of clock cycles of the digital clock signal. For example, if the counter inside the duty cycle adjuster 115 counts to 10 (for example, N is equal to 10), the PWM pulse generator 120 generates the PWM signal of 10% duty cycle. Similarly, if the counter of the duty cycle adjuster 115 counts to 50 (for example, N is equal to 50), the PWM pulse generator 120 generates the PWM signal of 50% duty cycle. It should be noted that in this example, the step size (or resolution) of the duty cycle can be 1% around a current duty cycle. For example, if the current duty cycle is 10%, the closest duty cycles that can be generated by the PWM pulse generator 120 are +/−1% of PWM duty-cycle of 10%, for example, either 9% or 11%.

In this example, the resolution (a minimum duty cycle step) of change in the duty cycle of the PWM signal is 1%, due to the digital clock signal frequency (100 MHz) and the switching frequency (1 MHz) of the DC-DC converter 105. It should be noted that in the control circuit 100, a step size finer than 1% or any fractional step size for changing the duty cycle of the PWM signal is difficult to achieve. Fundamentally, such step sizes of the change in duty cycle can be achieved by making changes in the switching frequency of the DC-DC converter 105 or in the clock frequency of the digital clock signal. For instance, a step size of 0.1% can be achieved by applying the digital clock signal of 1 GHz while keeping the switching frequency as 1 MHz. However, using the high frequency clock, for example, 1 GHz can be an unpractical solution in digital controllers, for example, phase locked loops (PLLs) present in such systems can be incapable of running at such high frequencies. Alternatively, the switching frequency can be reduced to 100 KHz while maintaining the digital clock signal of 100 MHz. However, as the switching frequency is reduced, sizes of storage elements in a filter network would typically go up.

Various embodiments of the present technology provide solutions that are capable of providing PWM signals of finer duty cycles to the DC-DC converters to thereby offer constant current drive for the illumination devices, and these solutions overcome the above described and other limitations, in addition to providing currently unavailable benefits. Various embodiments of the present technology are herein disclosed in conjunction with FIGS. 2-5.

Figure 2:
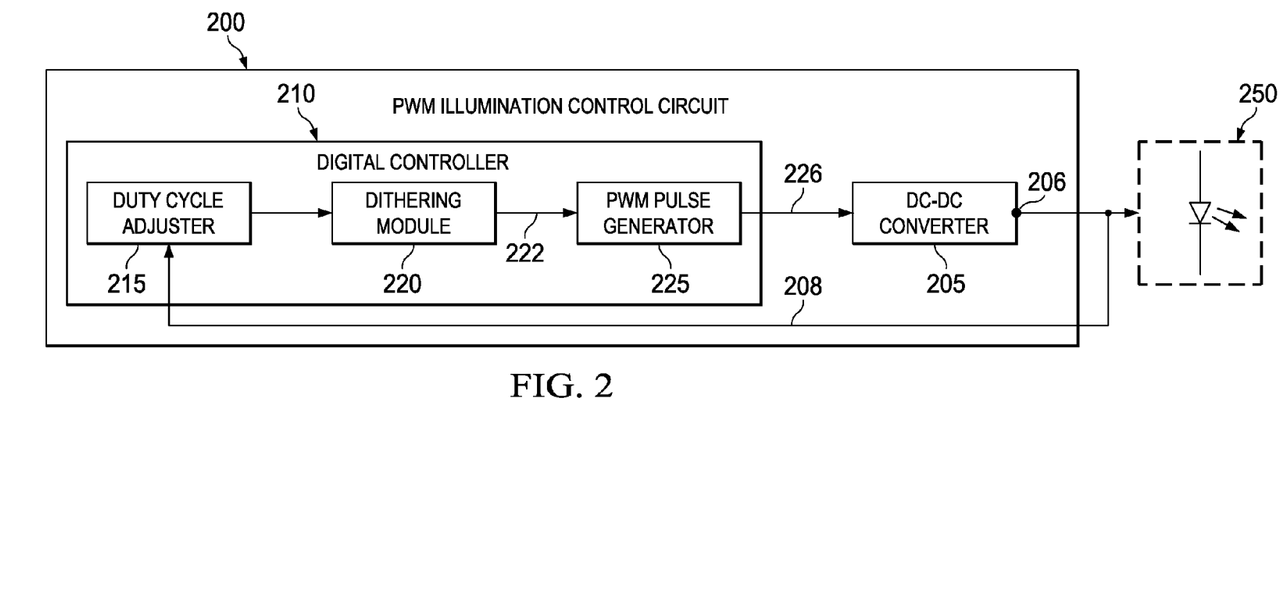
FIG. 2 illustrates a block diagram of an illumination control circuit for driving an illumination device, in accordance with an example embodiment.

FIG. 2 is a block diagram of an illumination control circuit for driving an illumination device, in accordance with an example embodiment of the present technology. A PWM illumination control circuit (hereinafter referred to as control circuit) 200 provides an illumination control signal to an illumination device 250. The illumination device 250 may be a LED or a LASER, and any other such light source used in a Time-of-Flight (ToF) imaging application. The illumination device 250 can be LED or LASER that can also be used in other applications, for example, lighting application, flash in camera, optical communication, or any application that includes generation of light by LED or LASER, or any similar light-sources.

The control circuit 200 includes a DC-DC converter 205 and a digital controller 210 for controlling an output signal of the DC-DC converter 205. The DC-DC converter 205 provides the output signal, for example, a controlled DC voltage (the illumination control signal) to the illumination device 250. The output signal (controlled DC voltage) acts as a constant drive signal for operating the illumination device 250. The DC-DC converter 205 can take form of a converter including, but not limited to, buck converter, boost converter, buck-boost converter and a flyback converter.

The digital controller 210 includes a duty cycle adjuster 215, a dithering module 220 and a PWM pulse generator 225. The duty cycle adjuster 215 is configured to receive a feedback signal corresponding to a variation in an output signal 208 received from an output 206 of the DC-DC converter 205 with respect to a pre-determined output signal. In an example embodiment, the duty cycle adjuster 215 includes a comparator that compares the output signal 208 to the pre-determined output signal, and determines the variation, for example, error in the output signal 208. In this example embodiment, the pre-determined output signal can be a constant output signal that is to be provided to the illumination device 250 for controlling the illumination device 250. In another example embodiment, the comparator can be configured to compare a signal generated in accordance with the output signal 208 to the pre-determined output signal. In this example embodiment, the signal can be a compensated signal generated in responsive to the output signal 208, and the pre-determined output signal can be a signal in accordance to the constant output signal that is to be provided to the illumination device 250 for controlling the illumination device 250.

The duty cycle adjuster 215 is configured to determine a target duty cycle of a PWM signal 226 that is capable of generating the pre-determined output signal at the output 206 of the DC-DC converter 205 so as to effectively control the illumination device 250. The duty cycle adjuster 215 is configured to determine the target duty cycle based on the feedback signal. In some cases, the target duty cycle can be a value of duty cycle that lies between two pre-determined duty cycles. For instance, the target duty cycle of the PWM signal 226 may be D+Δd, where Δd may be a decimal number. For instance, if the pre-determined duty cycles generated by the PWM pulse generator 225 are integer percentage numbers, for example, 1%, 2%, 3% . . . 100%, in some scenarios, the target duty cycle can be 10.4% lying between two pre-determined duty cycles 10% and 11%. Herein, the term 'pre-determined duty cycles' represents those duty cycles of the PWM signal 226 that can be fundamentally generated by the digital controller 210 due to step duty cycle changes, and the values of the pre-determined duty cycles depend upon the switching frequency of the DC-DC converter 205 and the clock frequency used in the digital controller 210.

The dithering module 220 is configured to determine a combination of two or more types of PWM signals, where each type of PWM signal has a distinct duty cycle. The dithering module 220 is further configured to provide a PWM control signal 222 to the PWM pulse generator 225. The PWM control signal 222 is generated such that the PWM pulse generator 225 generates a combination of the two or more types of PWM signals based on the PWM control signal 222. In an example embodiment, the dithering module 220 provides the PWM control signal 222 to the PWM pulse generator 225, where the PWM control signal 222 is generated based on the determined combination of the two or more types of PWM signals. Accordingly, the PWM pulse generator 225 generates the PWM signal 226 based on the PWM control signal 222, and the PWM signal 226 is provided to the DC-DC converter 205 to generate the pre-determined output signal for driving the illumination device 250.

Based on the PWM control signal 222, the PWM pulse generator 225 is configured to generate the PWM signal 226, where the PWM signal 226 has an effective duty cycle as equal to the target duty cycle over N switching pulses of the PWM signal 226. For instance, in an example, the PWM signal 226 of the effective duty cycle is provided by generating M switching pulses of a first PWM signal of a first duty cycle and generating N−M switching pulses of a second PWM signal of a second duty cycle. In this example, the M switching pulses of the first PWM signal and N−M switching pulses of the second PWM signal provide the effective duty cycle of the PWM signal 226 over the N switching pulses of the PWM signal 226.

Figure 3:
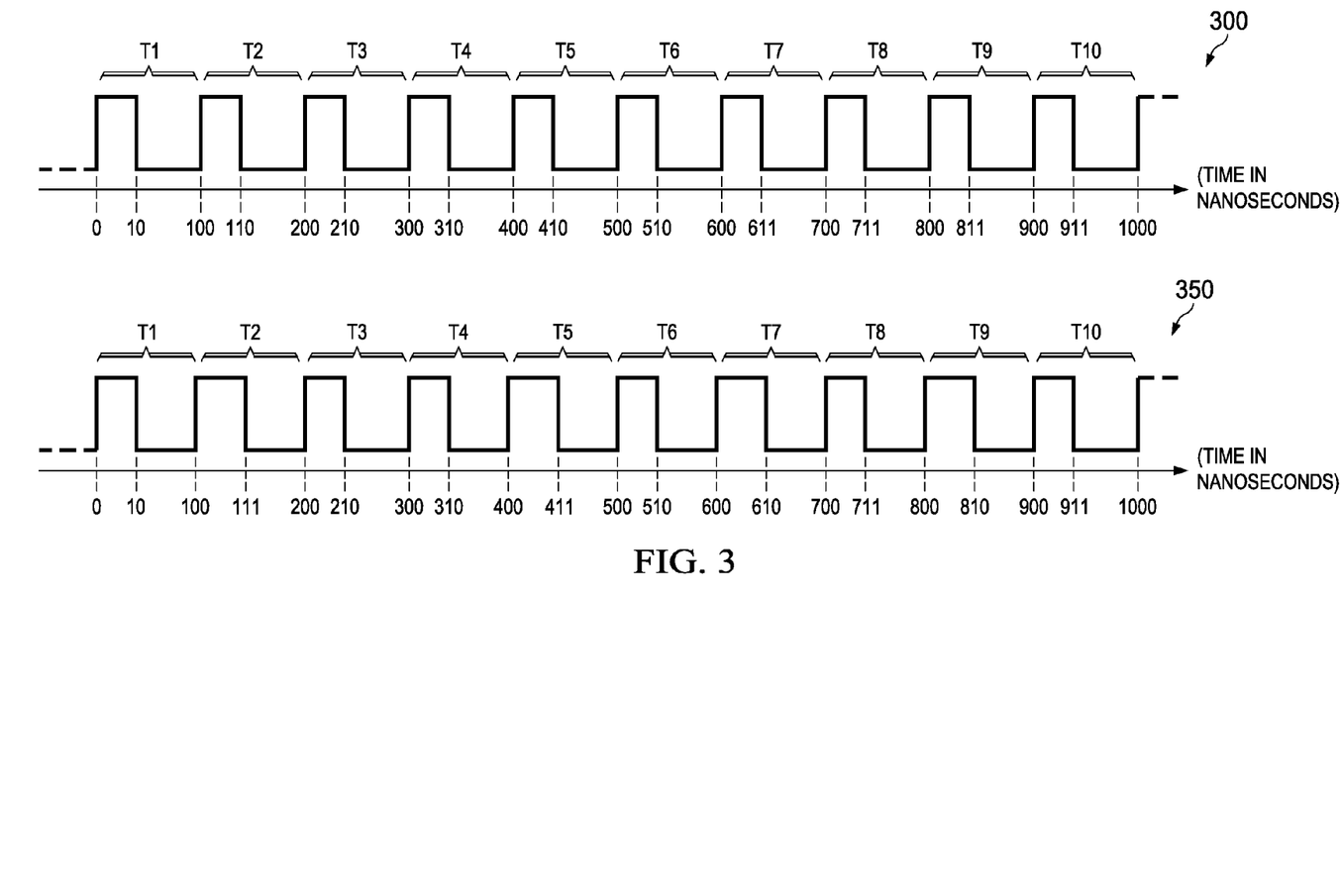
FIG. 3 is an example representation of generation of a target duty cycle, in accordance with an example embodiment.

An example representation of generation of the effective duty cycle as equal to the target duty cycle is shown in FIG. 3, in which a PWM signal of effective duty cycle of 10.4% is illustrated. In this example, the switching frequency of the DC-DC converter 205 is considered as 1 MHz, and a clock frequency of a digital clock signal in the digital controller 210 is 100 MHz. In a representation 300, switching pulses of a first PWM signal and a second PWM signal over 10 switching pulses (T1-T10) of PWM signals are shown. As shown in the representation 300, within time periods T1, T2, T3, T4, T5 and T6, 6 switching pulses of the first PWM signal of 10% duty cycle is generated; and within the time periods T7, T8, T9 and T10, 4 switching pulses of the second PWM signal of 11% duty cycle is generated. Within the time periods T1-T6, a count value (for duty cycle) selected by the dithering module 220 is 10 (for example, 0-10, 100-110, 200-210, 300-310, 400-410, 500-510), and accordingly, the first PWM signal of 10% duty cycle is generated. Further, within the time periods T7-T10, a count value selected by the dithering module 220 is 11 (for example, 600-611, 700-711, 800-811, 900-911), and accordingly, the second PWM signal of 11% duty cycle is generated. It should be understood to those skilled in the art that the effective duty cycle of a combination of the first PWM signal and the second PWM signal over a period of 10 switching pulses (T1-T10) is 10.4 (the target duty cycle).

The effective duty cycle of 10.4% can be generated by any pattern of combinations of the first PWM signal and the second PWM signal. For instance, in a representation 350 shown in FIG. 3, 6 switching pulses of the first PWM signal (for example, during the time periods T1, T3, T4, T6, T7 and T9) and 4 switching pulses of the second PWM signal (for example, during the time periods T2, T5, T8 and T10) generate a PWM of effective duty cycle of 10.4% over 10 switching pulses.

In an example embodiment, the effective duty cycle that can be generated by combination of the two or more types of PWM signals is also dependent upon a value of locations of poles in the DC-DC converter 205 and the digital controller 210. For instance, typically, a passive network in the DC-DC converter 205 has poles at about 1/M times of the switching frequency of the DC-DC converter 205. Some example values of M can lie between 5 and 10. In an example, if the value of M is 5, duty cycles can be generated in integral multiple of 0.2 around the pre-determined duty cycles (for example, 10±N*0.2, where N is 1 to 4), whereas if the value of M is 10, the duty cycles can be generated in the integral multiple of 0.1 around the pre-determined duty cycles (for example, 10±N*0.1, where N is 1 to 9).

Figure 4:
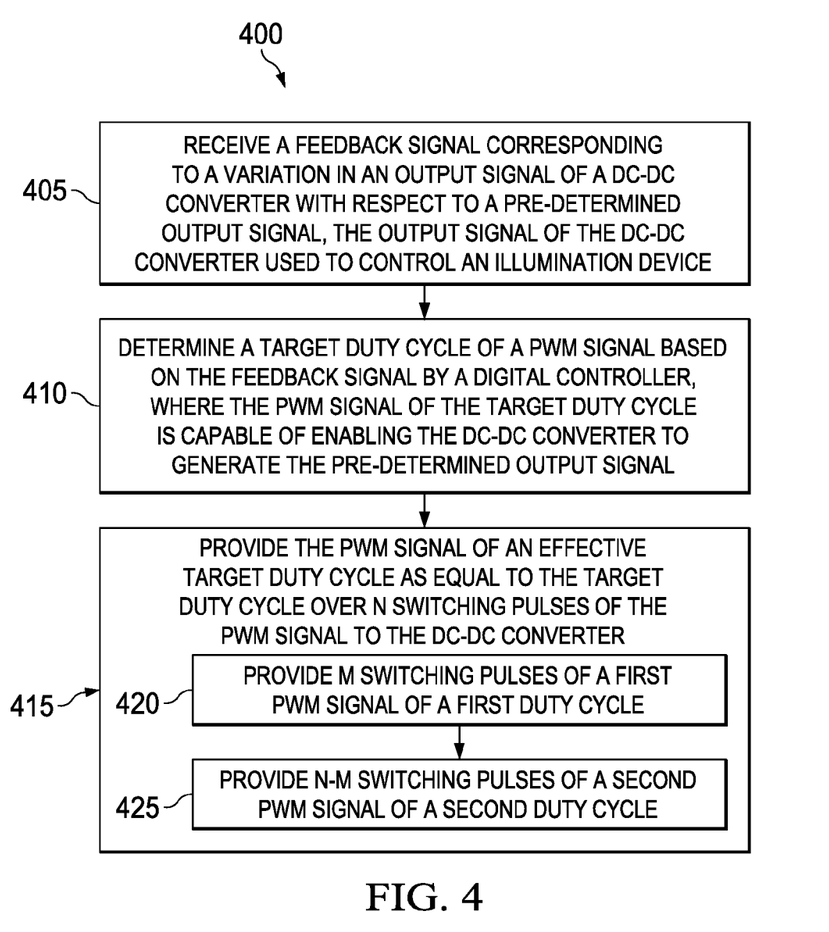
FIG. 4 illustrates a flowchart of an example method of controlling an illumination device, in accordance with an example embodiment.

FIG. 4 illustrates a flowchart of an example method 400 of controlling an illumination device, in accordance with an example embodiment. The method 400 can be performed in an illumination device such as the PWM illumination control circuit 200 explained with reference to FIG. 2.

At 405, the method 400 includes receiving a feedback signal corresponding to a variation in an output signal of a DC-DC converter (for example, the DC-DC converter 205) with respect to a pre-determined output signal. In an example, the feedback signal can be a difference of the output signal of the DC-DC converter and the pre-determined output signal, where the pre-determined output signal can be a drive input required to control the illumination device (for example, for providing a constant current drive to the illumination device).

The method 400 further includes controlling the output signal of the DC-DC converter so as to cause the output signal to be equal to the pre-determined output signal for controlling the illumination device, and the controlling the output signal is performed by operations of the blocks 410 and 415. At 410, the method 400 includes determining a target duty cycle of a PWM signal based on the feedback signal by a digital controller (for example, the digital controller 210 of FIG. 2). The target duty cycle is determined such that the PWM signal of the target duty cycle is capable of enabling the DC-DC converter to generate the pre-determined output signal. For instance, the duty cycle adjuster 215 (refer, FIG. 2) is capable of determining the target duty cycle based on the feedback signal.

At 415, the method 400 includes providing the PWM signal of an effective duty cycle as equal to the target duty cycle over N switching pulses of the PWM signal to the DC-DC converter. The operation of the block 415 is performed by the blocks 420 and 425. Operations at the blocks 420 and 425 can be performed in any order. At 420, M switching pulses of a first PWM signal of a first duty cycle are generated; and at 425, N−M (N minus M) switching pulses of a second PWM signal of a second duty cycle are generated. Herein, M and N are positive integer values. It should be understood that the effective duty cycle over N switching pulses is achieved by a combination of the M switching pulses of the first PWM signal (of the first duty cycle) and the N−M switching pulses of the second PWM signal (of the second duty cycle).

Figure 5:
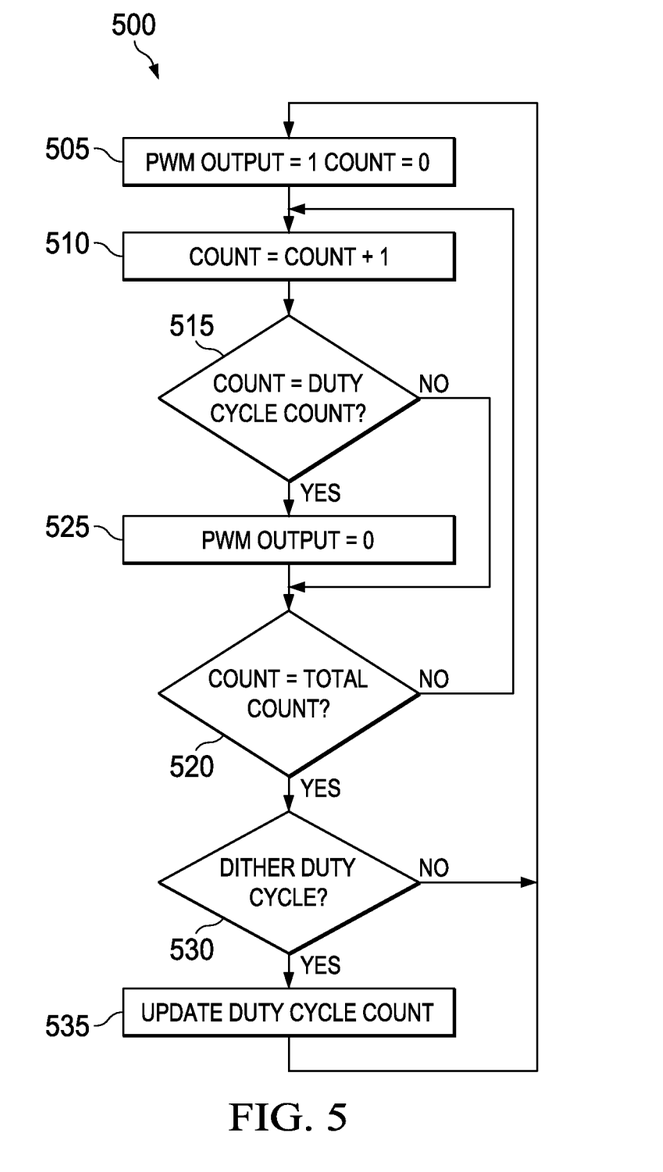
FIG. 5 illustrates a flow diagram of an example method of generating a PWM signal of an effective duty cycle, in accordance with an example embodiment.

FIG. 5 illustrates a flow diagram of an example method 500 of generating a PWM signal of an effective duty cycle as equal to the target duty cycle over N switching pulses of the PWM signal, according to an example embodiment. An example of switching frequency for the DC-DC converter (switching frequency of the PWM signal) as 1 MHz, and a clock frequency in a digital controller controlling the DC-DC converter as 100 MHz is assumed to explain the generation of the PWM signal of 10.4% duty cycle. For instance, the duty cycle adjuster 215 (refer, FIG. 2) determines the target duty cycle as 10.4% based on the feedback signal, and it is determined that 6 switching pulses of a first PWM signal and 4 switching pulses of a second PWM signal should be generated to generate an effective duty cycle of 10.4% over 10 switching pulses.

At 505, the method 500 includes setting a PWM output as high and setting a count value as equal to zero (0). For example, starting at the count zero (0), a first PWM signal is set as high. In an example embodiment, the control signal (see, the PWM control signal 222 explained in FIG. 2) is generated such that the output of the PWM pulse generator (see, 225 of FIG. 2) is set as high (due to the first PWM signal).

At 510, the count is incremented by 1. As each count is incremented in the digital controller 210 (refer, FIG. 2) with a frequency of 100 MHz, a time duration for incrementing each count is equal to a time period of 10 ns. At 515, it is determined whether the count is equal to a duty cycle count (for example, 10). If the count is not equal to the duty cycle count, the method 500 proceeds to 520, otherwise the method 500 proceeds to 525.

At 520, it is determined whether the count is equal to a 'total count' (for example, equal to 100). If the count is not equal to the 'total count', the method 500 proceeds to the block 510, and the count is incremented, and at 515 it is again determined whether the count is equal to the 'duty cycle count'. If the count is equal to the 'duty cycle count', at 525, the PWM output is switched to zero, and it is maintained as zero until the count becomes equal to 'total count'. If the count becomes equal to the 'total count', generation of a first switching pulse of the first PWM signal is completed.

At 530, it is determined if the duty cycle is to be dithered. For example, a decision is made as to which PWM signal among the two or more PWM signals should be generated by the dithering module 220 (refer, FIG. 2) for a subsequent switching pulse. In an example embodiment, whether the duty cycle should be dithered or not is dependent upon combination of the two or more PWM signals. For example, it is determined that 6 switching pulses of the first PWM signal of duty cycle count 10, and 4 switching pulses of the second PWM signal of duty cycle count 11 need to be generated. Accordingly, in an example, after the 6 switching pulses of the first PWM signal of 10% duty cycle (where the 'duty cycle count' is 10) is generated, a decision is made at the block 530 to dither the duty cycle for subsequent switching pulses of the 10 switching pulses. Accordingly, at 535, the 'duty cycle count' is updated from 10 to 11, and the $7^{th}$ switching pulse to $10^{th}$ switching pulse of the PWM signal (the second PWM signal) are generated with the duty cycle of 11%. As discussed in reference to FIG. 3, the effective duty cycle over the 10 switching pulses ($1^{st}$ to $6^{th}$ of the first PWM signal and $7^{th}$ to $10^{th}$ of the second PWM signal) is 10.4%, and this process is repeated till a change is determined in the target duty cycle by the duty cycle adjuster 215 (refer, FIG. 2).

Without in any way limiting the scope, interpretation, or application of the claims appearing below, effects of one or more of the example embodiments disclosed herein is to generate finer duty cycles of PWM signal for controlling the output of the DC-DC converter, where the DC-DC converter is utilized for a constant current drive for an illumination device. Various example embodiments of the present technology offer generation of those values of duty cycles that lie between pre-determined duty cycles (for example, duty cycles that are generated due to step duty-cycle change) of the PWM signal. Various example embodiments of the present technology are capable of generating finer duty cycles of the PWM signal without usage of additional components or without usage of any higher frequency phase locked loop (PLL) in a digital controller of the DC-DC converter.

Although the present technology has been described with reference to specific example embodiments, it is noted that various modifications and changes can be made to these embodiments without departing from the broad spirit and scope of the present technology. For example, the various circuits, etc., described herein can be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods can be embodied using transistors, logic gates, and electrical circuits (for example, application specific integrated circuit (ASIC) circuitry and/or in Digital Signal Processor (DSP) circuitry).

Particularly, the duty cycle adjuster 215, the dithering module 220, the PWM pulse generator 225 may be enabled using software and/or using transistors, logic gates, and electrical circuits (e.g., integrated circuit circuitry, such as, for example, ASIC circuitry). Embodiments of the present disclosure include one or more computer programs stored or otherwise embodied on a computer-readable medium, wherein the computer programs are configured to cause a processor to perform one or more operations, for methods 400 and 500. A computer-readable medium storing, embodying, or encoded with a computer program, or similar language, may be embodied as a tangible data storage device storing one or more software programs that are configured to cause a processor to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, devices, subsystems and methods described and illustrated in the various embodiments as discrete or separate can be combined or integrated with other systems, modules, techniques, or methods without departing from the scope of the present technology. Other items shown or discussed as directly coupled or communicating with each other can be coupled through some interface or device, such that the items can no longer be considered directly coupled to each other but can still be indirectly coupled and in communication, whether electrically, mechanically, or otherwise, with one another. Other examples of changes, substitutions, and alterations ascertainable by one skilled in the art, upon or subsequent to studying the example embodiments disclosed herein, can be made without departing from the spirit and scope of the present technology.

It is noted that the terminology "coupled to" does not necessarily indicate a direct physical relationship. For example, when two components are described as being "coupled to" one another, there may be one or more other devices, materials, etc., that are coupled between, attaching, integrating, etc., the two components. As such, the terminology "coupled to" shall be given its broadest possible meaning unless otherwise indicated.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present technology. Thus, discussions of the features and advantages, and similar language, throughout this specification but do not necessarily, refer to the same embodiment.

Various embodiments of the present disclosure, as discussed above, are practiced with steps and/or operations in a different order, and/or with hardware elements in configurations which are different than those which are disclosed. Therefore, although the technology has been described based upon these example embodiments, it is noted that certain modifications, variations, and alternative constructions are apparent and well within the spirit and scope of the technology.

Although various example embodiments of the present technology are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. A method of controlling an illumination device by an output signal of a DC-DC converter, the method comprising:
   receiving a feedback signal based on the output signal of the DC-DC converter; and
   controlling the output signal of the DC-DC converter by:
      determining a target duty cycle of a target Pulse Width Modulation (PWM) signal based on comparing the feedback signal with a reference output signal of the DC-DC converter,
      determining a combination of
         M switching pulses of a first PWM signal of a first duty cycle and
         N–M switching pulses of a second PWM signal of a second duty cycle such that the combination results in the target PWM signal over N switching pulses of the PWM signal, wherein M and N are positive integers, and
      generating the target PWM signal based on the combination of the M switching pulses of the first PWM signal and the N–M switching pulses of the second PWM signal, wherein a duty cycle resolution of the target PWM signal is based on a relationship between a switching frequency of the DC-DC converter and a frequency of a pole formed due to components of the DC-DC converter.

2. The method of claim 1, wherein determining the combination such that the combination results in the target PWM signal comprises determining the values of M, N, the first duty cycle, and the second duty cycle.

3. The method of claim 1, wherein the feedback signal is a difference signal of the output signal and the reference output signal.

4. The method of claim 1, wherein the DC-DC converter is a boost converter.

5. The method of claim 1, wherein the DC-DC converter is a buck converter.

6. The method of claim 1, wherein the DC-DC converter is a buck-boost converter.

7. The method of claim 1, wherein the illumination device is a light emitting diode (LED) or a light amplification by stimulated emission of radiation (LASER) device used in a time-of-flight imaging application.

8. A pulse width modulation (PWM) illumination control circuit for controlling an illumination device, comprising:
   a DC-DC converter for providing an output signal to the illumination device; and
   a digital controller coupled to the DC-DC converter for controlling the output signal of the DC-DC converter, the digital controller receiving a feedback signal based on the output signal, the digital controller comprising:
      a duty cycle adjuster to determine a target duty cycle of a target PWM signal based on comparing the feedback signal with a reference output signal of the DC-DC converter,
      a dithering module coupled to the duty cycle adjuster, the dithering module to determine a combination of
         M switching pulses of a first PWM signal of a first duty cycle and
         N–M switching pulses of a second PWM signal of a second duty cycle such that the combination results in the target PWM signal over N switching pulses of the PWM signal, wherein M and N are positive integers, and
      a PWM pulse generator coupled to the dithering module, the PWM pulse generator to generate the target PWM signal based on the combination of the M switching pulses of the first PWM signal and the N–M switching pulses of the second PWM signal,
      wherein a duty cycle resolution of the target PWM signal is based on a relationship between a switching frequency of the DC-DC converter and a frequency of a pole formed due to components of the DC-DC converter.

9. The PWM illumination control circuit of claim 8, wherein the PWM pulse generator generates the target PWM signal based on a PWM control signal generated by the dithering module, the dithering module configured to generate the PWM control signal based on a value of the first duty cycle and a value of the second duty cycle.

10. The PWM illumination control circuit of claim 8, wherein the feedback signal is a difference signal of the output signal and the reference output signal.

11. The PWM illumination control circuit of claim 8, wherein the DC-DC converter is a boost converter.

12. The PWM illumination control circuit of claim 8, wherein the DC-DC converter is a buck converter.

13. The PWM illumination control circuit of claim 8, wherein the DC-DC converter is a buck-boost converter.

14. The PWM illumination control circuit of claim 8, wherein the illumination device is a light emitting diode (LED) used in a time-of-flight imaging application.

15. The PWM illumination control circuit of claim 8, wherein the illumination device is a light amplification by stimulated emission of radiation (LASER) device used in a time-of-flight imaging application.

16. A method of controlling an illumination device by an output signal of a DC-DC converter, the method comprising:
   receiving a feedback signal based on the output signal of the DC-DC converter; and
   controlling the output signal of the DC-DC converter by:
      determining a target duty cycle of a target Pulse Width Modulation (PWM) signal based on comparing the feedback signal with a reference output signal of the DC-DC converter, and
      generating the target PWM signal having the target duty cycle based on a combination of two or more PWM signals, each PWM signal of the two or more PWM signals having distinct duty cycles, wherein a duty cycle resolution of the target PWM signal is based on a relationship between a switching frequency of the DC-DC converter and a frequency of a pole formed due to components of the DC-DC converter.

17. The method of claim 16, wherein generating the target PWM signal comprises generating the target PWM signal having the target duty cycle over N switching pulses of the target PWM signal, wherein the N switching pulses comprises a combination of the one or more switching pulses of each of the two or more PWM signals.

18. The method of claim 16, wherein the illumination device is one of a light emitting diode (LED) or a light amplification by stimulated emission of radiation (LASER) device used in a time-of-flight imaging application.

* * * * *